US008343297B2

(12) United States Patent
Liu et al.

(10) Patent No.: US 8,343,297 B2
(45) Date of Patent: Jan. 1, 2013

(54) METHOD FOR MAKING CARBON NANOTUBE FILM

(75) Inventors: Liang Liu, Beijing (CN); Kai-Li Jiang, Beijing (CN); Shou-Shan Fan, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 71 days.

(21) Appl. No.: 12/969,597

(22) Filed: Dec. 16, 2010

(65) Prior Publication Data

US 2011/0120633 A1 May 26, 2011

Related U.S. Application Data

(62) Division of application No. 11/967,114, filed on Dec. 29, 2007, now Pat. No. 7,992,616.

(30) Foreign Application Priority Data

Oct. 10, 2007 (CN) .......................... 2007 1 0123816

(51) Int. Cl.

| | |
|---|---|
| ***B29C 55/02*** | (2006.01) |
| ***B29C 65/00*** | (2006.01) |
| ***B32B 38/10*** | (2006.01) |
| ***B32B 37/00*** | (2006.01) |
| ***B82Y 40/00*** | (2011.01) |
| ***A61F 13/15*** | (2006.01) |

(52) U.S. Cl. ......... 156/229; 156/160; 156/250; 977/888

(58) Field of Classification Search .................. 156/229, 156/250, 160; 977/888; *B29C 55/02, 65/00; B32B 38/10, 37/00; B82Y 40/00; A61F 13/15*
See application file for complete search history.

(56) References Cited

U.S. PATENT DOCUMENTS

| | | | | |
|---|---|---|---|---|
| 5,301,863 | A * | 4/1994 | Prinz et al. | 228/33 |
| 6,232,706 | B1 * | 5/2001 | Dai et al. | 313/309 |
| 7,198,452 | B2 * | 4/2007 | Kirykowicz | 414/749.1 |
| 7,744,793 | B2 * | 6/2010 | Lemaire et al. | 264/172.19 |
| 2008/0170982 | A1 * | 7/2008 | Zhang et al. | 423/447.3 |

OTHER PUBLICATIONS

Huang et al., Self-Templated Growth of Carbon-Nanotube Walls at High Temperatures (Small, vol. 3, Issue 10, pp. 1735-1739, Oct. 1, 2007).*

(Continued)

*Primary Examiner* — Philip Tucker
*Assistant Examiner* — Shawn F Hogan
(74) *Attorney, Agent, or Firm* — Altis Law Group, Inc.

(57) ABSTRACT

A method for making a carbon nanotube film includes the following steps. A carbon nanotube array fixed on a substrate holder is provided. A carbon nanotube film is drawn from the carbon nanotube array. A first part of the carbon nanotube film is adhered to a first bar placed on a bar supply device. The carbon nanotube film is stretched by the first bar. A second part of the carbon nanotube film is adhered to a second bar positioned on the bar supply device. A third part of the carbon nanotube film is adhered to a supporting element placed on a carrier device. The third part of the carbon nanotube film is separated from the first part and the second part of carbon nanotube film. The third part of the carbon nanotube film adhered to the supporting element is obtained.

19 Claims, 2 Drawing Sheets

100
130
124
140
118
142
134
116
132
126
114
112
122
110
120

OTHER PUBLICATIONS

Satishkumar et al., Oxide nanotubes prepared using carbon nanotubes as templates (Journal of Materials Research, vol. 12, No. 3, pp. 604-606 (1997)).*

Bartsch et al., Effects of Catalyst Pre-Treatment on the Growth of Single-Walled carbon nanotubes by Microwave CVD (Carbon, vol. 45, Issue 3, Mar. 2007, pp. 543-552, Received Jun. 11, 2006, Accepted Oct. 23, 2006, Available online Dec. 5, 2006).*

Wikipedia, Carbon nanotube (http://en.wikipedia.org/wiki/Carbon_nanotube (accessed Mar. 29, 2012)).*

* cited by examiner

METHOD FOR MAKING CARBON NANOTUBE FILM

RELATED APPLICATIONS

This application is a divisional application of U.S. patent application, entitled "APPARATUS AND METHOD FOR MAKING CARBON NANOTUBE FILM" with application Ser. No. 11/967,114, filed on Dec. 29, 2007 now U.S. Pat. No. 7,992,616. U.S. patent application Ser. No. 11/967,114, claims the benefit of priority under 35 U.S.C. 119 from Chinese Patent Application 200710123816.3 filed on Oct. 10, 2007 in the China Intellectual Property Office, disclosure of which is incorporated herein by reference.

BACKGROUND

1. Technical Field

The present invention relates to a method for making carbon nanotube film.

2. Discussion of Related Art

Carbon nanotubes (CNTs) are a novel carbonaceous material and have received a great deal of interest since the early 1990s. Carbon nanotubes have interesting and potentially useful electrical and mechanical properties. Due to these and other properties, CNTs have become an important new material for use in a variety of fields. However, the acquired CNTs are generally in a form of particles or powder and that is inconvenient for applications. So it is necessary to make carbon nanotube film.

Nowadays, methods for making carbon nanotube film include, using chemical vapor deposition (CVD) to grow a carbon nanotube film by dissolving carbon nanotube powder into a solvent to form a solution, coating the solution onto a surface of a substrate, and drying the solution thereon to form a carbon nanotube film. There is also the Langmuir Blodgett (LB) method, which involves mixing the carbon nanotube solution with another solution having a different density, causing the carbon nanotubes to float on the surface of the solution to form a carbon nanotube film. The carbon nanotube film acquired by the LB method is a uniform net structure and the carbon nanotubes in the carbon nanotube film are dispersed uniformly and without agglomeration. But the carbon nanotubes in the carbon nanotube film are disordered and not conducive to exploitation.

What's more, the aforementioned methods for making carbon nanotube film are limited to laboratory use, and so are not suitable for use in a mass production setting.

What is needed, therefore, is an apparatus and a method for making the carbon nanotube film, the apparatus being easy to manipulate, and the method being conducive to mass production, and the carbon nanotubes in the carbon nanotube film are dispersed uniformly and arranged in a preferred orientation.

SUMMARY

In one embodiment, an apparatus for making a carbon nanotube film includes a substrate holder, a bar supplying device, a carrier device, and a stretching device arranged in alignment in that order.

Other advantages and novel features of the present apparatus and method for making a carbon nanotube film will become more apparent from the following detailed description of preferred embodiments when taken in conjunction with the accompanying drawings.

BRIEF DESCRIPTION OF THE DRAWINGS

Many aspects of the present apparatus and method for making the carbon nanotube film can be better understood with reference to the following drawings. The components in the drawings are not necessarily to scale, the emphasis instead being placed upon clearly illustrating the principles of the present apparatus and method for making the carbon nanotube film.

Figure 1:
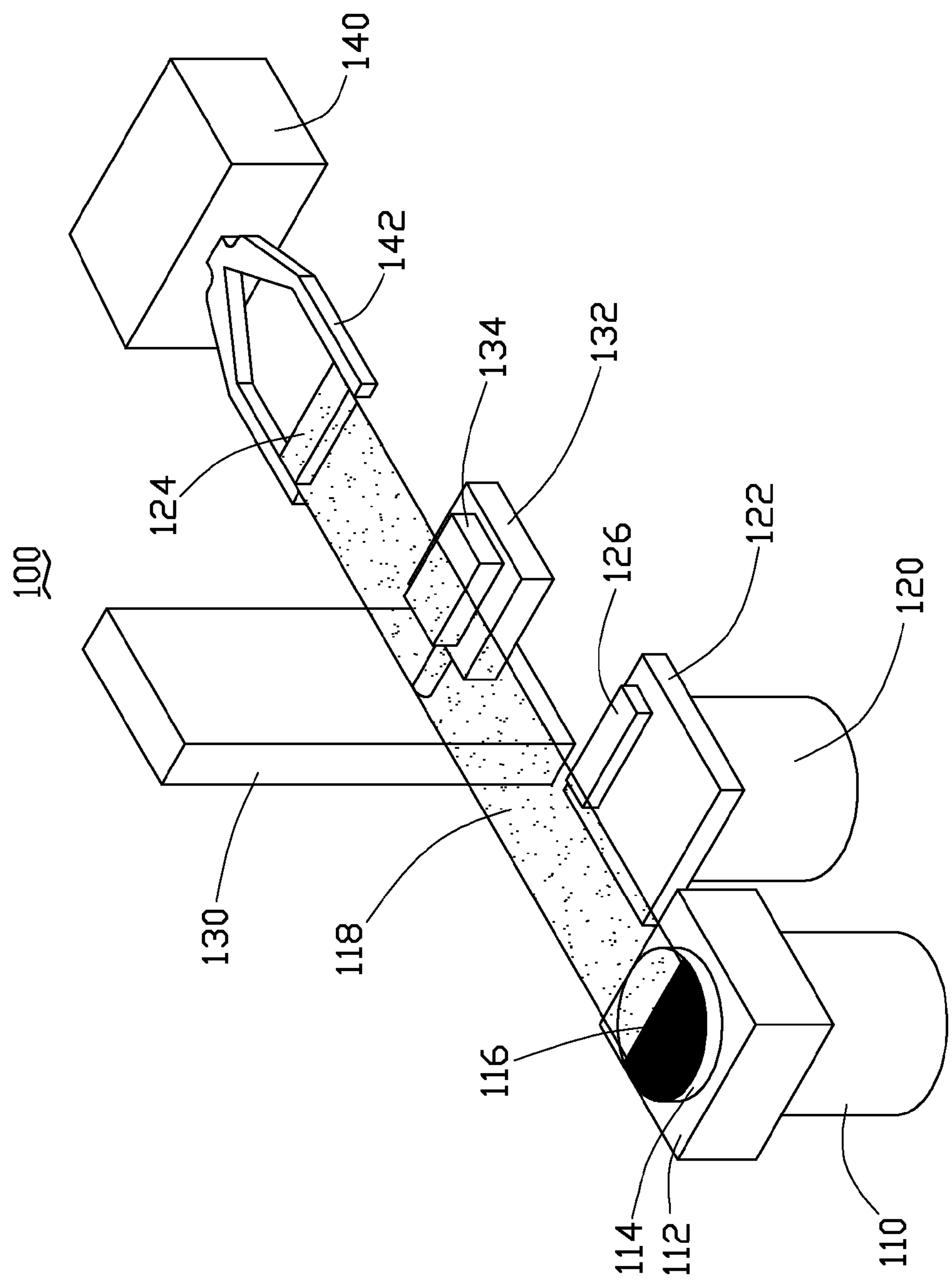
FIG. 1 is a schematic view of an apparatus for making a carbon nanotube film.

Corresponding reference characters indicate corresponding parts throughout the several views. The exemplifications set out herein illustrate at least one preferred embodiment of the present apparatus and method for making the carbon nanotube film, in at least one form, and such exemplifications are not to be construed as limiting the scope of the invention in any manner.

DETAILED DESCRIPTION

Reference will now be made to the drawings to describe, in detail, embodiments of the present apparatus and method for making the carbon nanotube film.

Referring to FIG. 1, an apparatus 100 for making a carbon nanotube film includes a substrate holder 110, a bar supplying device 120, a carrier device 130, and a stretching device 140 arranged in alignment in that order.

The substrate holder 110 is a fixed device for supporting a substrate. The substrate holder 110 has a planar surface 112, and the substrate with a carbon nanotube array 116 formed thereon, can be fixed, such as with an adhesive, on the planar surface 112 of the substrate holder 110. A carbon nanotube film 118 with a predetermined length can be drawn from the carbon nanotube array 116 by a drawing tool.

The bar supply device 120 has a supply stage 122. Bars are placed on the surface of the supply stage 122 of the bar supply device 120. The bars are strip-shaped or cube-shaped. The supply stage 122 is kept continuously supplied with bars during production of the carbon nanotube film. The material of the bars can be selected from a group consisting of metal, glass, rubber and plastic. Beneficially, the material of the bars is metal in the present embodiment. The length of each bar is greater than the width of the carbon nanotube film 118. The supply device 120 and the supply stage 122 can be raised or lowered either manually or by computer control.

The carrier device 130 includes a carrier stage 132. The carrier stage 132 can be rotated about a central axis thereof perpendicular to the face of the carrier stage 132, and can also be raised or lowered via computer control. In operation, a supporting element 134 is disposed on the carrier stage 132 for collecting and supporting the carbon nanotube films prepared by the apparatus 100.

The stretching device 140 includes a fixing device 142. The fixing device 142 can be a generally U-shaped clamp with an adjustable opening facing the carbon nanotube array 116. The stretching device 140 is configured to move to the supply stage 122, and then the fixing device 142 is controlled to seize a bar by the ends thereof and then the stretching device 140 moves away from the supply stage 122 and the substrate holder 110. The fixing device 142 can be controlled to move up and down and side to side to control the drawing of the carbon nanotube film. The direction and the speed of the movement of the fixing device 142 can be adjusted via the computer. In operation, the fixing device 142 can clamp the two ends of a first bar 124 and, with the carbon nanotube film 118 attached to the bar 124, the stretching device 140 moves back, stretch the carbon nanotube film 118 along the drawing direction thereof.

Figure 2:
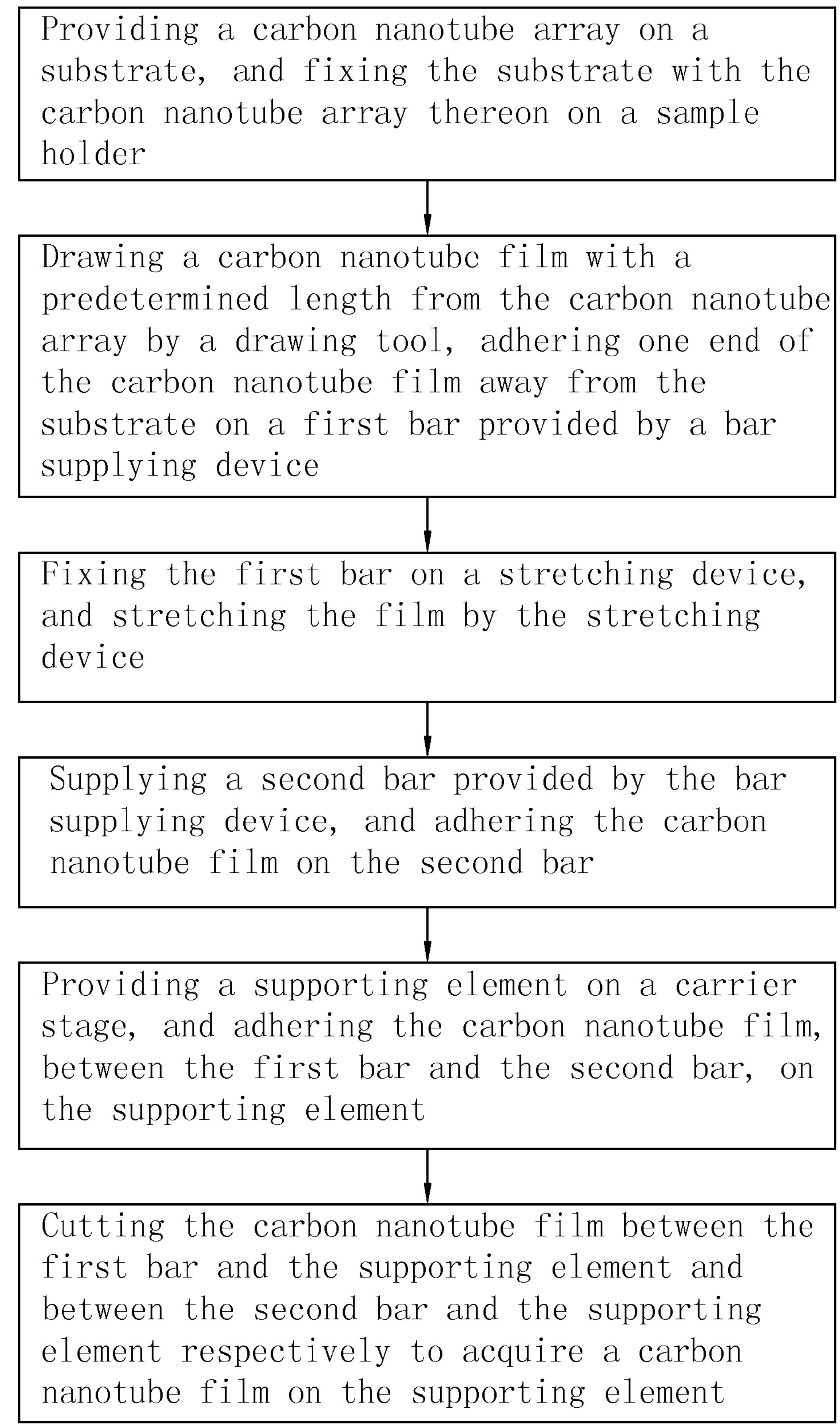
FIG. 2 is flow chart of a method for making a carbon nanotube film using the apparatus of FIG. 1.

Referring to FIG. 2, a method for making a carbon nanotube film using the apparatus 100 includes the following steps of: (a) providing the carbon nanotube array 116 on the substrate 114, and fixing the substrate 114 with the carbon nanotube array 116 thereon to the substrate holder 110; (b) drawing the carbon nanotube film 118 with a predetermined length from the carbon nanotube array 116 by a drawing tool, adhering one end of the carbon nanotube film 118 to the first bar 124 on the supply stage 122 of the bar supply device 120; (c) fixing the first bar 124 to the stretching device 140, and stretching the carbon nanotube film via pulling the first bar 124 by the stretching device 140 for a certain length; (d) supplying a second bar 126 on the supply stage 122 of the bar supply device 120, and adhering a part of the carbon nanotube film 118 above the second bar 126 to the second bar 126; (e) providing a supporting element 134 on the carrier stage 132, and adhering a part of the carbon nanotube film 118 between the first bar 124 and the second bar 126 to the supporting element 134; and (f) cutting the carbon nanotube film 118 between the first bar 124 and the supporting element 134 and between the second bar 126 and the supporting element 134 respectively to acquire the carbon nanotube film 118 on the supporting element 134.

In step (a), the carbon nanotube array 116 is a super-aligned array of carbon nanotubes. The super-aligned array of carbon nanotubes can be formed by the steps of: (a1) providing a substantially flat and smooth substrate 114; (a2) forming a catalyst layer on the substrate 114; (a3) annealing the substrate 114 with the catalyst layer thereon in air at a temperature in an approximate range from 700° C. to 900° C. for about 30 to 90 minutes; (a4) heating the substrate 114 with the catalyst layer thereon at a temperature in an approximate range from 500° C. to 740° C. in a furnace with a protective gas therein; and (a5) supplying a carbon source gas to the furnace for about 5 to 30 minutes and growing a super-aligned array of carbon nanotubes on the substrate.

In step (a1), the substrate 114 can be a P-type silicon wafer, an N-type silicon wafer, or a silicon wafer with a film of silicon dioxide thereon. Preferably, a 4 inch P-type silicon wafer is used as the substrate. In step (a2), the catalyst can, advantageously, be made of iron (Fe), cobalt (Co), nickel (Ni), or any alloy thereof.

In step (a4), the protective gas can, beneficially, be made up of at least one of nitrogen (N2), ammonia (NH3), and a noble gas. In step (a5), the carbon source gas can be a hydrocarbon gas, such as ethylene (C2H4), methane (CH4), acetylene (C2H2), ethane (C2H6), or any combination thereof.

The super-aligned array of carbon nanotubes can, opportunely, have a height of about 200 to 400 microns and includes a plurality of carbon nanotubes parallel to each other and approximately perpendicular to the substrate. The super-aligned array of carbon nanotubes formed under the above conditions is essentially free of impurities, such as carbonaceous or residual catalyst particles. The carbon nanotubes in the super-aligned array are closely packed together by the van der Waals attractive force.

In step (a), the substrate 114 and the carbon nanotube array 116 can be fixed on a substrate holder 110 via adhesive or adhesive tape.

Step (b) further includes the substeps of: (b1) selecting a plurality of carbon nanotube segments having a predetermined width from the array of carbon nanotubes; (b2) pulling the carbon nanotube segments at an even/uniform speed to form the carbon nanotube film 118.

In step (b1), quite usefully, the carbon nanotube segments having a predetermined width can be selected by using an adhesive tape as a tool to contact with the super-aligned array. In step (b2), an angle between the direction of stretching the carbon nanotube film and the growing direction of the carbon nanotube array 114 is in an approximate range from 30° to 90°. Beneficially, the stretching direction is substantially perpendicular to the growing direction of the carbon nanotube array 114. The height of the bar supply device 120 can be adjusted to make the bottom surface of the carbon nanotube film 118 contact with and adhere to the first bar 124 supplied by the bar supply device 120 to keep the carbon nanotube film 118 stretched.

More specifically, during the pulling process, as the initial carbon nanotube segments are drawn out, other carbon nanotube segments are also drawn out end to end, due to the van der Waals attractive force between ends of adjacent segments. The carbon nanotube film 118 produced in such manner can be selectively formed having a predetermined width. The carbon nanotube film 118 includes a plurality of carbon nanotube segments. The carbon nanotubes in the carbon nanotube film 118 are mainly parallel to the pulling direction of the carbon nanotube film 118.

A width of the carbon nanotube film 118 depends on a size of the carbon nanotube array 114. A length of the carbon nanotube film 118 can be arbitrarily set as desired. In one useful embodiment, when the substrate 114 is a 4 inch type wafer as in the present embodiment, a width of the carbon nanotube film 118 is in an approximate range from 1 centimeter to 10 centimeters. The thickness of the carbon nanotube film 118 is in an approximate range from 10 nanometers to 100 micrometers.

It is noted that because the carbon nanotubes in the super-aligned carbon nanotube array have a high purity and a high specific surface area, the carbon nanotube film 118 is adhesive. As such, the carbon nanotube film 118 can be adhered to the surface of the bars directly.

In step (c), the length of the carbon nanotube film is longer than the distance between the substrate 114 and the supporting element 134. Step (c) includes the substeps of: (c1) moving the fixing device 142 of the stretching device 140 close to the first bar 124; (c2) seizing of the first bar 124 by the fixing device 142; (c3) adjusting the stretching device 140 to stretch the carbon nanotube film 118 via pulling the first bar 124 along a direction perpendicular to the growing direction of the carbon nanotube array 114 and stretching the carbon nanotube film 118 for a certain length to make a part of the carbon nanotube film 118 being disposed above the carrier stage 132.

In the present embodiment, the fixing device 142 can generally be a U-shaped clamp with an opening facing the carbon nanotube array 116. The width of the opening of the fixing device 142 can be adjusted. Step (c2) can be executed by moving the fixing device 142 near to the first bar 124, the first bar 124 being disposed at the opening of the U-shaped clamp, and adjusting the width of the opening to clamp the two ends of the bar 124 via the U-shaped clamp and fixing the first bar 124 on the stretching device 140.

In step (d), a part of the carbon nanotube film 118 between the first bar 124 and the second bar 126 is hung. In step (e), the supporting element 134 having a predetermined shape can be a material supporting the carbon nanotube film and the supporting element 134 can be a substrate or a frame. In the present embodiment, the supporting element 134 is a square substrate. The material of the supporting element 134 can be any material, such as metal, plastic glass, or rubber. Beneficially, the material of the supporting element 134 is metal.

Step (e) includes the substeps of: (e1) placing the supporting element 134 on the carrier stage 132 of the carrier device 130; (e2) adjusting the position of the carrier stage 132 to position the supporting element 134 below the carbon nanotube film 118 between the first bar 124 and the second bar 126; (e3) adjusting the height of the carrier stage 132 of the carrier device 130 and the height of the fixing device 142 to contact the bottom surface of a part of the carbon nanotube film 118 above the supporting element 134 with the supporting element 134 and the carbon nanotube film 118 being adhered thereon.

In step (f), when a part of the carbon nanotube film 118 is on the supporting element 134, the other part of the carbon nanotube film 118 stretched by the second bar 126 is kept in a state of stretching. Repeating step (c), step (d), step (e) and step (f), and a plurality of carbon nanotube films 118 can be accumulated on the supporting element 134 and the angle between the aligned direction of the adjacent two layers of carbon nanotube films 118 can be adjusted via rotating the carrier stage 132 in a horizontal surface. The carbon nanotube films 118 overlaps each other to form a multi-layer carbon nanotube film structure.

A method for making the multi-layer carbon nanotube film structure includes the steps of: (g) fixing the second bar 126 on the stretching device 140, stretching the carbon nanotube film 118 via pulling the second bar 126 by the stretching device 140 for a certain length; (h) supplying a third bar on the supply stage 122 of the bar supply device 120 and adhering a part of the carbon nanotube film 118, above the third bar, to the third bar; (i) adjusting the height of the supporting element 134 and adhering the carbon nanotube film 118 between the second bar 124 and the third bar on the supporting element 134; and (j) cutting the carbon nanotube film 118 between the second bar 124 and the supporting element 134 and between the third bar and the supporting element 134 respectively to acquire another carbon nanotube film 118 on the supporting element 134. Repeating step (g), step (h), step (i) and step (j), and a multi-layer carbon nanotube film structure can be acquired on the same supporting element 134. It can be understood that replacing the supporting element 134, a plurality of carbon nanotube films 118 can be acquired.

Compared to the conventional apparatus and method for making carbon nanotube film, the present apparatus and method for making carbon nanotube film have the following virtues: firstly, the apparatus is easy to be manipulated and can realize semi-automatic continuous production and mass production via being controlled by computer; secondly, the carbon nanotubes in the carbon nanotube film drawn directly from the carbon nanotube array has a uniform distribution therein and are arranged in a preferred orientation.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

What is claimed is:

1. A method for making a carbon nanotube film, the method comprising:

(a) providing a carbon nanotube array grown on a substrate and fixing the substrate with the carbon nanotube array on a substrate holder;

(b) drawing a carbon nanotube film from the carbon nanotube array, and adhering a first part of the carbon nanotube film to a first bar placed on a bar supply device;

(c) stretching the carbon nanotube film by the first bar, and adhering a second part of the carbon nanotube film to a second bar positioned on the bar supply device;

(d) suspending a third part of the carbon nanotube film between the first bar and the second bar over a supporting element, the supporting element is placed on a carrier device; and adhering the third part of the carbon nanotube film to the supporting element; and (e) separating the third part of the carbon nanotube film from the first part and the second part of carbon nanotube film, the third part of the carbon nanotube film adhered to the supporting element is obtained.

2. The method as claimed in claim 1, wherein the substrate holder has a planar surface, and the step (a) further comprises: (a1) growing the carbon nanotube array on the substrate; and (a2) fixing the substrate with the carbon nanotube array grown thereon on the planar surface.

3. The method as claimed in claim 2, wherein the step (a1) further comprises:

(a11) providing the substrate;

(a12) forming a catalyst layer on the substrate;

(a13) annealing the substrate with the catalyst layer in air at a temperature in an approximate range from 700° C. to 900° C. for about 30 to about 90 minutes;

(a14) heating the substrate with the catalyst layer at a temperature in an approximate range from 500° C. to 740° C. in a furnace with a protective gas therein; and (a15) supplying a carbon source gas to the furnace for about 5 to about 30 minutes to obtain a supper aligned carbon nanotube array.

4. The method as claimed in claim 1, wherein the bar supply device has a supply stage, and the step (b) further comprises:

(b1) providing a first bar fixed on the supply stage;

(b2) selecting a plurality of carbon nanotube segments having a predetermined width from the carbon nanotube array;

(b3) pulling the plurality of carbon nanotube segments at a uniform speed to form the carbon nanotube film having the predetermined width; and (b4) adhering the first part of the carbon nanotube film to the first bar.

5. The method as claimed in claim 4, wherein the first bar is strip-shaped or cube-shaped.

6. The method as claimed in claim 4, wherein an angle defined between a direction of stretching the carbon nanotube film and a growing direction of the carbon nanotube array is in an approximate range from 30 degrees to 90 degrees.

7. The method as claimed in claim 4, wherein the carbon nanotube film comprises a plurality of carbon nanotubes substantially parallel to a pulling direction.

8. The method as claimed in claim 1, further comprising a stretching device to stretch the carbon nanotube film, the stretching device comprises a fixing device, and the step (c) comprises:

(c1) seizing the first bar by the fixing device;

(c2) pulling the first bar along a fixed direction using the fixing device such that the carbon nanotube film is stretched along the fixed direction for a certain length;

(c3) providing the second bar on the bar supply device; and (c4) adhering the second part of the carbon nanotube film to the second bar.

9. The method as claimed in claim 8, wherein the stretching device is a U-shaped clamp with an adjustable opening facing the carbon nanotube array; and in the step (c1), two ends of the first bar are seized by the U-shaped clamp.

10. The method as claimed in claim 1, wherein step (d) comprises:

(d1) placing the supporting element on the carrier device;

(d2) adjusting a position of the carrier stage to position the supporting element below the third part of the carbon nanotube film; and (d3) adjusting a height of the carrier stage and a height of the fixing device to contact a bottom surface of the third part of the carbon nanotube film above the supporting element, and adhering the bottom surface of the third part of the carbon nanotube film to the supporting element.

11. The method as claimed in claim 1, wherein step (e) further comprises: (e1) separating the first part of the carbon nanotube film from the third part of the carbon nanotube film; and (e2) separating the second part of the carbon nanotube film from the third part of the carbon nanotube film.

12. The method as claimed in claim 1, wherein the supporting element is a substrate or a frame.

13. A method for making a multi-layer carbon nanotube film, the method comprising:

(a) providing a carbon nanotube array grown on a substrate, and fixing the substrate with the carbon nanotube array on a substrate holder;

(b) drawing a carbon nanotube film from the carbon nanotube array, and adhering a first part of the carbon nanotube film to a first bar placed on a bar supply device;

(c) fixing the first bar to a stretching device, and pulling the first bar to draw the carbon nanotube film a certain length;

(d) supplying a second bar on the bar supply device, and adhering a second part of the carbon nanotube film to the second bar;

(e) applying a supporting element on a carrier stage, suspending a third part of the carbon nanotube film between the first bar and the second bar over the supporting element, and adhering the third part of the carbon nanotube film to the supporting element;

(f) cutting off the third part of the carbon nanotube film from the first part and the second part of the carbon nanotube film, the third part of the carbon nanotube film being adhered to the supporting element; and (g) fixing the second bar to the stretching device and pulling the second bar to stretch the carbon nanotube film, and moving the second bar over the supporting element with the third part of the carbon nanotube film;

(h) applying a third bar on the bar supply device, and adhering a fourth part of the carbon nanotube film to the third bar;

(i) rotating the carrier stage to a predetermined angle in a horizontal surface such that the supporting element with the third part of the carbon nanotube film is rotated to the predetermined angle, and adhering a fifth part of the carbon nanotube film between the second bar and the third bar to the third part of the carbon nanotube film; and (j) separating the fifth part of the carbon nanotube film from the carbon nanotube film.

14. The method as claimed in claim 13, wherein the first bar, the second bar, and the third bar are metal, glass, rubber or plastic.

15. The method as claimed in claim 13, wherein the stretching device is a U-shaped clamp with an adjustable opening facing the carbon nanotube array; and the step (c) comprises seizing two ends of the first bar by the U-shaped clamp, and moving the U-shaped clamp away from the carbon nanotube array such that the first bar is pulled away from the carbon nanotube array and the carbon nanotube film is stretched.

16. The method as claimed in claim 13, wherein step (e) comprises:

(e1) placing the supporting element on the carrier stage;

(e2) adjusting a position of the carrier stage to position the supporting element below the carbon nanotube film between the first bar and the second bar; and (e3) adjusting a height of the carrier stage and a height of the fixing device to contact a bottom surface of the third part of the carbon nanotube film above the supporting element with the supporting element, and adhering the bottom surface of the third part of the carbon nanotube film to the supporting element.

17. The method as claimed in claim 13, wherein the supporting element is a substrate or a frame.

18. The method as claimed in claim 13, wherein an angle defined between a direction of stretching the carbon nanotube film and a growing direction of the carbon nanotube array is from about 30 degrees to about 90 degrees.

19. A method for making a carbon nanotube film, the method comprising:

(a) providing a carbon nanotube array grown on a substrate, and loading the substrate with the carbon nanotube array on a substrate holder;

(b) drawing a carbon nanotube film from the carbon nanotube array, and adhering a first portion of the carbon nanotube film to a first bar placed on a bar supply device;

(c) moving the first bar along a direction far away from the substrate holder, and moving the first bar over a supporting element;

(d) adhering a second portion of the carbon nanotube film to a second bar placed on the bar supply device;

(e) adhering a third portion of the carbon nanotube film between the first bar and the second bar to a surface of the supporting element; and (f) cutting the carbon nanotube film along edges of the supporting element to obtain the third portion of the carbon nanotube film adhered to the supporting element.

* * * * *